under 35

(12) United States Patent
Uchida

(10) Patent No.: US 10,915,278 B2
(45) Date of Patent: Feb. 9, 2021

(54) INFORMATION PROCESSING APPARATUS THAT PROVIDES PRINT DATA TO PRINTER AND CONTROL METHOD THEREFOR

(71) Applicant: CANON KABUSHIKI KAISHA, Tokyo (JP)

(72) Inventor: Tatsuro Uchida, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/528,994

(22) Filed: Aug. 1, 2019

(65) Prior Publication Data

US 2020/0081670 A1    Mar. 12, 2020

(30) Foreign Application Priority Data

Sep. 6, 2018   (JP) .................................. 2018-167037

(51) Int. Cl.
*G06K 15/00*   (2006.01)
*G06F 3/12*    (2006.01)

(52) U.S. Cl.
CPC .......... *G06F 3/1254* (2013.01); *G06F 3/1204* (2013.01); *G06F 3/1205* (2013.01); *G06F 3/1208* (2013.01)

(58) Field of Classification Search
None
See application file for complete search history.

(56) References Cited

U.S. PATENT DOCUMENTS

2011/0176154 A1*   7/2011   Ichihashi ............... G06K 15/02
                                                                358/1.9
2011/0242567 A1*  10/2011   Miyata .................. G06F 3/1256
                                                                358/1.13

FOREIGN PATENT DOCUMENTS

JP    2005182694 A  *  7/2005
JP    2005182694 A     7/2005

* cited by examiner

*Primary Examiner* — Henok Shiferaw
(74) *Attorney, Agent, or Firm* — Rossi, Kimms & McDowell LLP

(57) ABSTRACT

An information processing apparatus which is capable of generating print data based on which appropriate printed matter intended by the user is output. The information processing apparatus receives an instruction to print a page comprising a plurality of objects. A print processor draws a part of the plurality of objects after rotating them and draws the rest of the objects without rotating them. A printer driver rotates the rest of the objects that have been drawn without being rotated.

10 Claims, 9 Drawing Sheets

100

INFORMATION PROCESSING APPARATUS THAT PROVIDES PRINT DATA TO PRINTER AND CONTROL METHOD THEREFOR

BACKGROUND OF THE INVENTION

Field of the Invention

The present invention relates to an information processing apparatus and a control method therefor.

Description of the Related Art

An information processing apparatus which provides a printer with print data to perform printing is known. The information processing apparatus has a printer driver and a print processor, which is a preprocess module for the printer driver (see, for example, Japanese Laid-Open Patent Publication (Kokai) No. 2005-182694). In the information processing apparatus, the print processor generates a drawing instruction based on print settings, which are configured by a user, as well as document data, and the printer driver converts the drawing instruction into print data printable by a printer. Examples of the print settings include information on a brush which is a graphics object, and information on N in 1 printing in which a plurality of logical pages is combined into one sheet and printed. The brush is a drawing object obtained by filling in an area on a print sheet which is designated by a user (hereafter referred to as a "user-designated area") with a predetermined drawing pattern such as oblique lines.

For example, in a case where information on 2 in 1 printing is configured as a print setting, the print processor generates a drawing instruction to draw two adjacent logical pages as one piece of drawing data. In a case where the logical pages are configured to have different orientations such as a landscape orientation and a portrait orientation, the print processor generates a drawing instruction to rotate one of the logical pages in accordance with an orientation of the other one and draw the rotated one next to the other one. Thus, the information processing apparatus generates print data based on which appropriate printed matter intended by the user is output.

Conventionally, however, the print processor cannot incorporate detailed instructions for respective drawing objects into a drawing instruction, and hence there may be cases where the print processor cannot generate print data based on which appropriate printed matter intended by the user is output. For example, when generating a drawing instruction to perform 2 in 1 printing of two logical pages including brushes and configured to have different orientations, the print processor cannot incorporate detailed instructions for respective drawing objects, and more specifically, information for changing drawing pattern orientations of the brushes into the drawing instruction. As a result, the print processor cannot generate print data based on which appropriate printed matter intended by the user is output.

SUMMARY OF THE INVENTION

The present invention provides an information processing apparatus and a control method therefor which are capable of generating print data based on which appropriate printed matter intended by a user is output.

Accordingly, the present invention provides an information processing apparatus comprising a receiving unit configured to receive an instruction to print a page comprising a plurality of objects, a drawing unit configured to rotate and then draw a part of the plurality of objects and draw the rest of the objects without rotating the rest, and a rotating unit configured to rotate the rest of the objects that have been drawn without being rotated.

According to the present invention, print data based on which appropriate printed matter intended by a user is output is generated.

Further features of the present invention will become apparent from the following description of exemplary embodiments (with reference to the attached drawings).

DESCRIPTION OF THE EMBODIMENTS

An embodiment of the present invention will now be described in detail with reference to the accompanying drawings.

Figure 1:
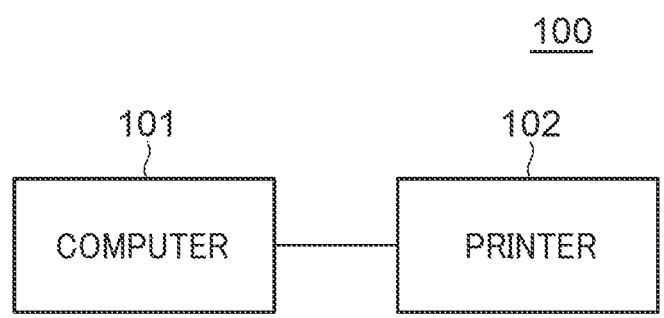
FIG. 1 is a block diagram schematically showing an arrangement of a printing system including a computer which is an information processing apparatus according to an embodiment of the present invention.

FIG. 1 is a block diagram schematically showing an arrangement of a printing system 100 including a computer 101 which is an information processing apparatus according to an embodiment of the present invention. Referring to FIG. 1, the printing system 100 has the computer 101 and a printer 102. The computer 101 is capable of carrying out wired LAN communications with the printer 102 via a wired LAN cable (not shown) or carrying out wireless communications with the printer 102. Based on an instruction from a user, for example, the computer 101 generates print data for causing the printer 102 to perform printing and sends the generated print data to the printer 102. The printer 102 performs printing on a sheet based on the received print data.

Figure 2:
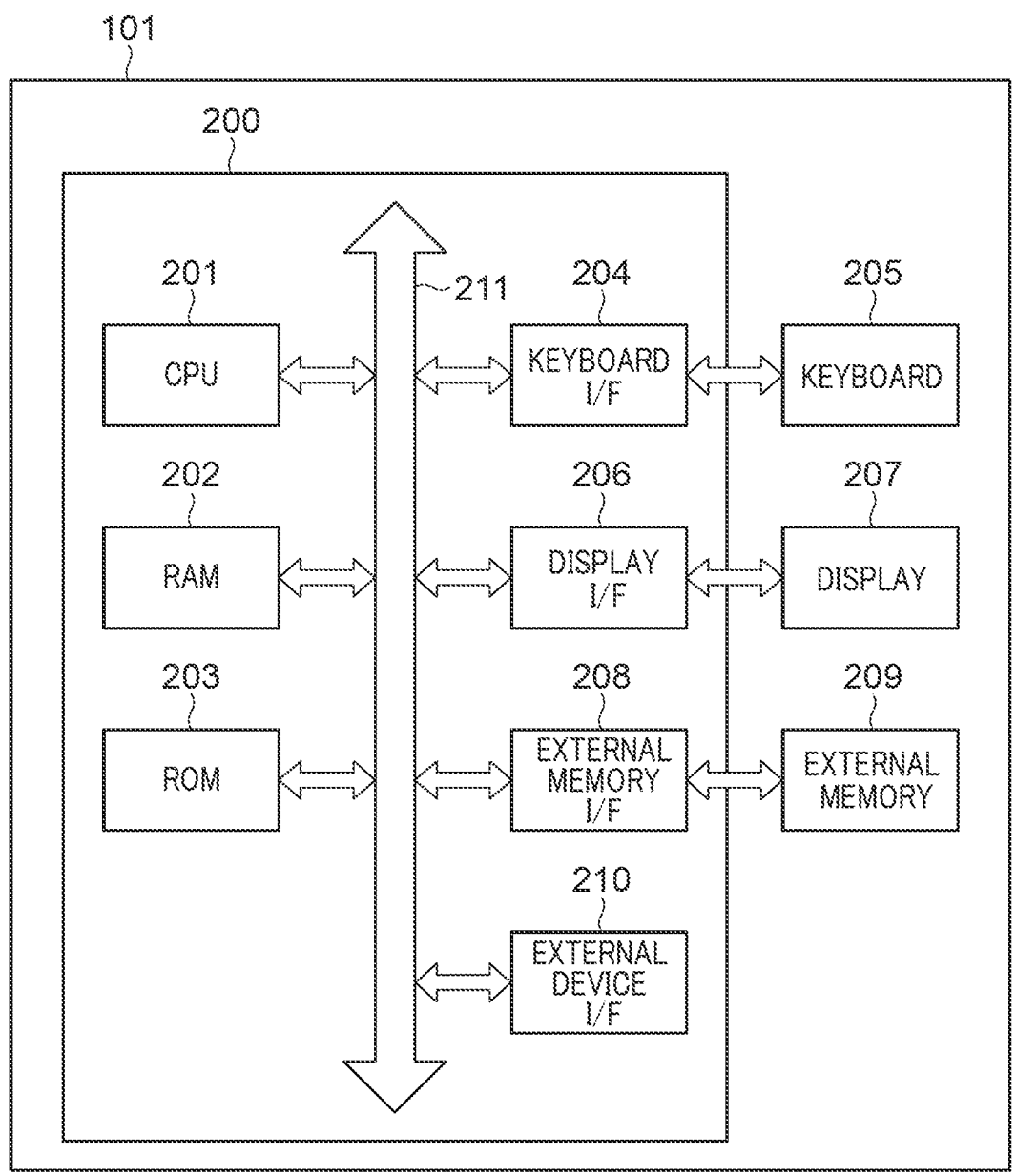
FIG. 2 is a block diagram schematically showing a hardware arrangement of the computer in FIG. 1.

FIG. 2 is a block diagram schematically showing a hardware arrangement of the computer 101 in FIG. 1. Referring to FIG. 2, the computer 101 has a control unit 200, a keyboard 205, a display 207, and an external memory 209. The control unit 200 is connected to the keyboard 205, the display 207, and the external memory 209. The control unit 207 also has a CPU 201, a RAM 202, a ROM 203, a keyboard I/F 204, a display I/F 206, an external memory I/F 208, and an external device I/F 210. The CPU 201, the RAM 202, the ROM 203, the keyboard I/F 204, the display I/F 206, the external memory I/F 208, and the external device I/F 210 are connected to one another via a system bus 211.

It should be noted that "CPU" is an abbreviation of a central processing unit. "RAM" is an abbreviation of a random-access memory. "ROM" is an abbreviation of a read-only memory.

The control unit 200 integratedly controls the entire computer 101. The CPU 201 loads programs stored in the ROM 203 and the external memory 209 into the RAM 202 and executes the programs loaded into the RAM 202 to implement functions of respective modules in FIG. 3, which will be described later. The keyboard I/F 204 is an I/F for connecting the keyboard 205 to the control unit 200. The keyboard 205 functions as a receiving unit that receives user operations. The display I/F 206 is an I/F for connecting the display 207 to the control unit 200. The display 207 functions as a display unit that displays various types of information provided to the user. The external memory I/F 208 carries out communications with the external memory 209 such as a USB memory or a memory card which is connected to the computer 101. The external device I/F 210 controls data communications with an external device such as the printer 102.

Figure 3:
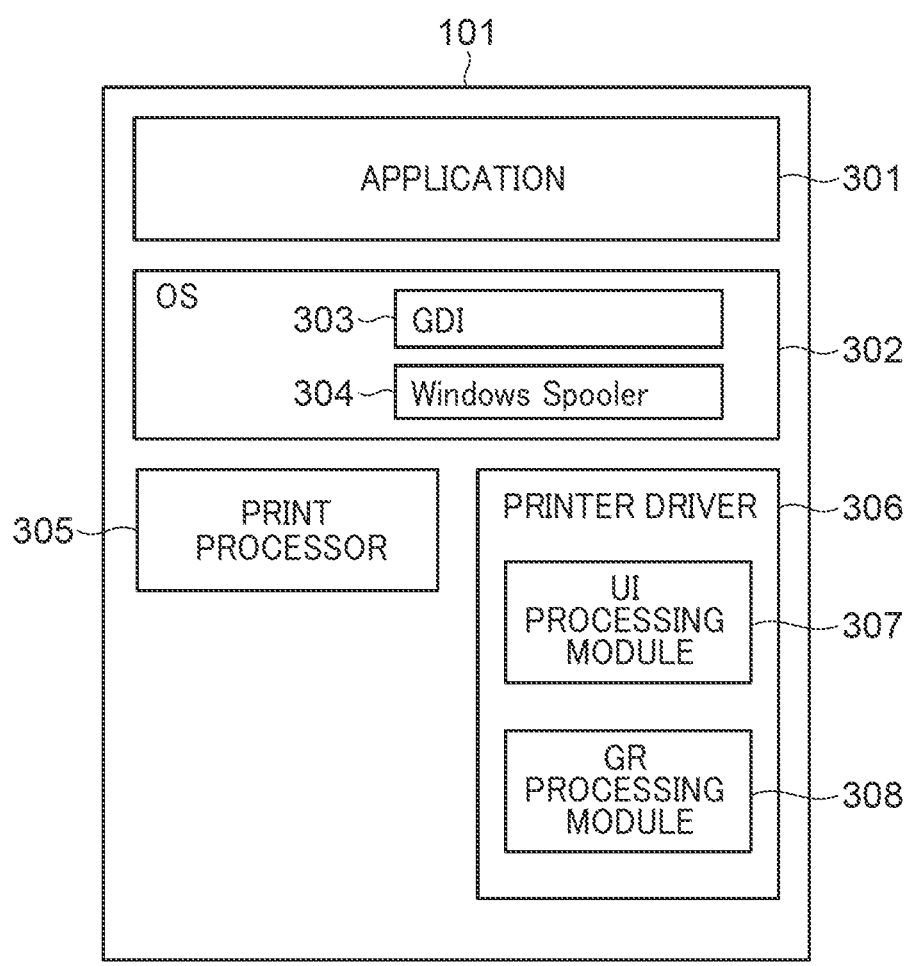
FIG. 3 is a block diagram schematically showing a software arrangement of the computer in FIG. 1.

FIG. 3 is a block diagram schematically showing a software arrangement of the computer 101 in FIG. 1. Referring to FIG. 3, the computer 101 has an application 301, an OS 302, a print processor 305 (drawing instruction issuing unit), and a printer driver 306 (data conversion unit) as modules. Processes in each of the modules in FIG. 3 are implemented by the CPU 201 executing programs stored in the ROM 203 and the external memory 209.

The application 301 issues an instruction to start a print data generating job in which print data is generated. The OS 302 is comprised of a GDI 303 and a Windows spooler 304 and performs basic control on the computer 101. The GDI 303 provides an application layer with drawing phases including printing. The Windows spooler 304 carries out a process related to storage of a spool file 401 in FIG. 4, which will be described later. The Windows spooler 304 carries out a process related to transmission of print data.

The print processor 305 calls an API of the GDI 303 to issue a drawing instruction based on print settings configured by the user. The print processor 305 also calls an API of the GDI 303 to output the drawing instruction to the printer driver 306. The printer driver 306 is comprised of a UI processing module 307 and a GR processing module 308. The UI processing module 307 generates print setting information based on print settings configured by the user. The print setting information includes, for example, printing orientations of respective pages, information on N in 1 printing, information on a brush, and information on enlargement and reduction of print images. The GR processing module 308 converts the obtained drawing instruction into print data printable by the printer 102.

Figure 4:
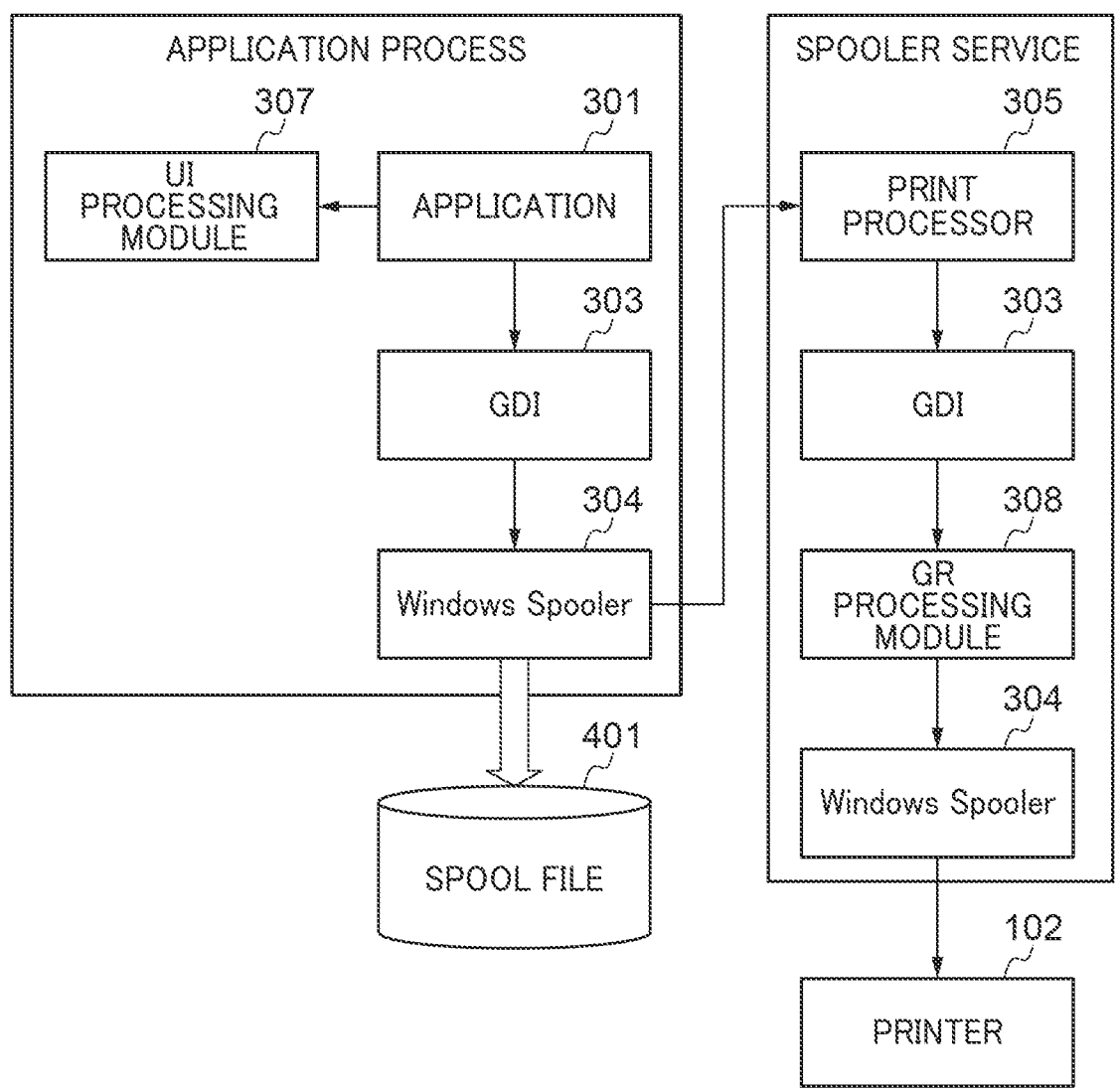
FIG. 4 is a view useful in explaining how print data is generated by the computer in FIG. 1.

FIG. 4 is a view useful in explaining how print data is generated by the computer 101 in FIG. 1. Upon receiving an instruction to generate print data from the user via the keyboard 205, the computer 101 loads the application 301 onto an application process of the computer 101.

Referring to FIG. 4, the application 301 loaded onto the application process issues an instruction to start a print data generating job. As a result, the print processor 305 is loaded onto a spooler service of the computer 101. The application 301 also causes the UI processing module 307 of the printer driver 306 to generate print setting information based on information input by the user by the keyboard 205. Then, the application 301 calls an API of the GDI 303 to output drawing data, which is required to generate the print setting information and the print data, to the GDI 303. The GDI 303 causes the Windows spooler 304 to store the print setting information and the drawing data obtained from the application 301 as the spool file 401. The spool file 401 is in the EMF (Enhanced Metafile) format. The EMF format is a file format of an intermediate file that is created for printing at high speed when printing is performed on Windows.

Figure 5A:
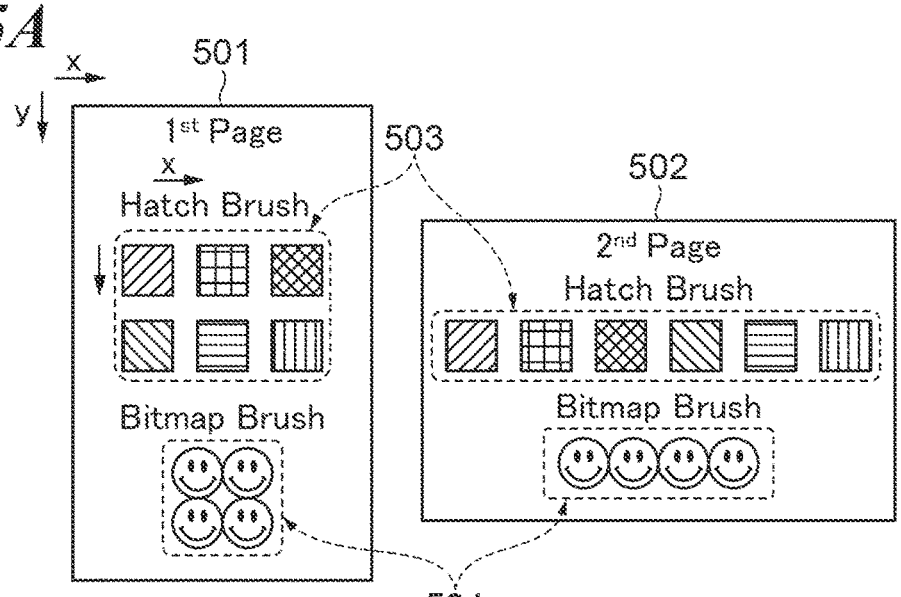
FIGS. 5A to 5C are views useful in explaining drawing by the computer in FIG. 1.

On the other hand, when the storage of the spool file 401 is completed, the print processor 305 loaded onto the spooler service calls an API of the GDI 303 generates a drawing instruction related to the spool file 401. The print processor 305 generates a drawing instruction to draw, for example, drawing data 501 and 502 in FIG. 5A. The drawing data 501 is configured in portrait orientation. The drawing data 502 is configured in landscape orientation. Each of drawing data 501 and 502 includes a hatch brush 503 and a bitmap brush 504. It should be noted that a brush is a drawing object created by the user filling in a user designated area with a predetermined pattern. In the hatch brush 503, a user-designated area is a filled in with a drawing pattern designated by the user from among a plurality of drawing patterns determined in advance such as horizontal lines, oblique lines, and vertical lines. In the bitmap brush 504, predetermined bitmaps such as character images designated by the user are spread all over to fill in a user designated area. The generated drawing instruction is output to the GR processing module 308 of the printer driver 306 via the GDI 303. The GR processing module 308 converts the obtained drawing instruction into print data in a data format printable by the printer 102. The GR processing module 308 also outputs the converted print data to the Windows spooler 304. The Windows spooler 304 sends the obtained print data to the printer 102. The printer 102 performs printing on a sheet based on the received print data from the computer 101.

Figure 5B:
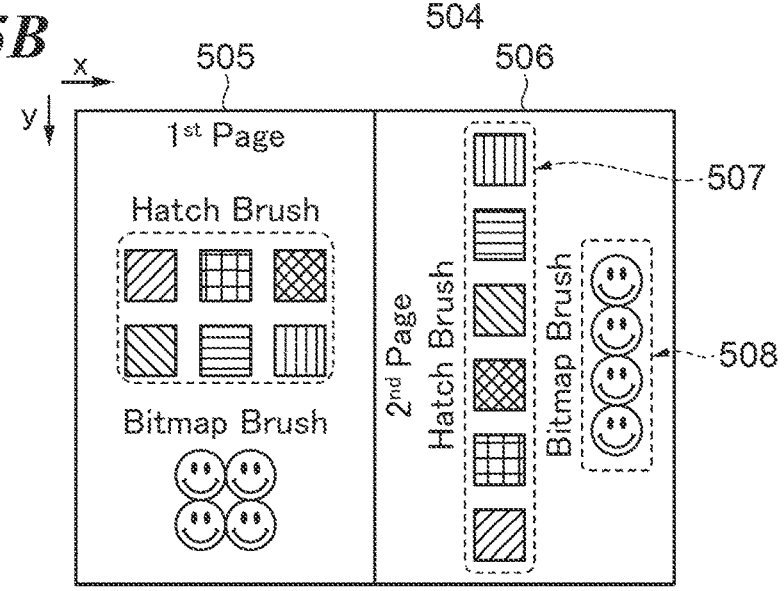
Figure 5C:
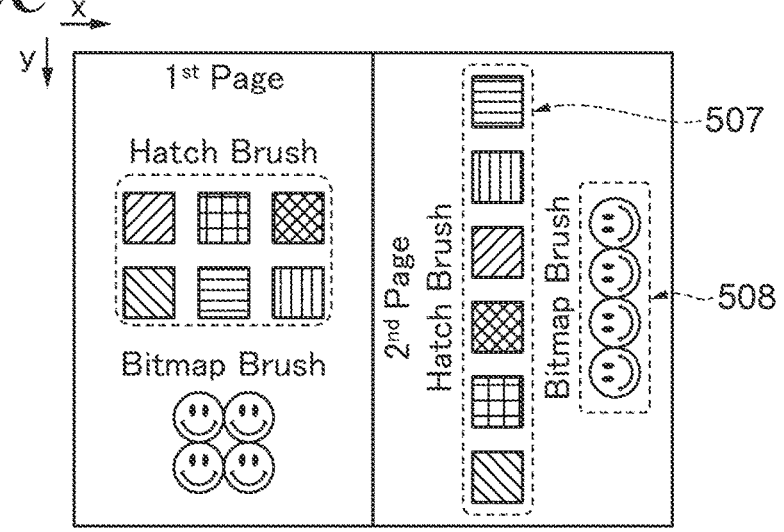

For example, in 2 in 1 printing with logical pages of two pieces of drawing data configured in different data orientations as with the drawing data 501 and 502, the print processor 305 generates a drawing instruction to draw a logical page 506, which has been rotated 90 degrees to match an orientation of a logical page 505, next to the logical page 505 as shown in FIG. 5B. The print processor 305, however, cannot incorporate instructions for respective drawing object, and more specifically, information for converting an orientation of a brush drawing pattern in a drawing instruction. For this reason, such a drawing instruction that the orientations of drawing patterns of the hatch brush 507 and the bitmap brush 508 are not converted on the logical page 506, which has been rotated 90 degrees to match the orientation of the logical page 505, is generated as shown in FIG. 5B, and this drawing instruction is output to the GDI 303 and the printer driver 306. As a result, print data based on which appropriate printed matter intended by the user is output cannot be generated. In the present embodiment, when an instruction to rotate drawing data is included in a drawing instruction, the print processor 305 notifies the printer driver 306 of coordinate transformation parameters for rotating a brush included in drawing data. Based on the coordinate transformation parameters, the printer driver 306 performs processing to rotate a brush in print data. As a result, for example, print data in which the orientations of the hatch brush 507 and the bitmap brush 508 have been converted in accordance with the orientation of the logical page 506 is generated as shown in FIG. 5C.

Figure 6:
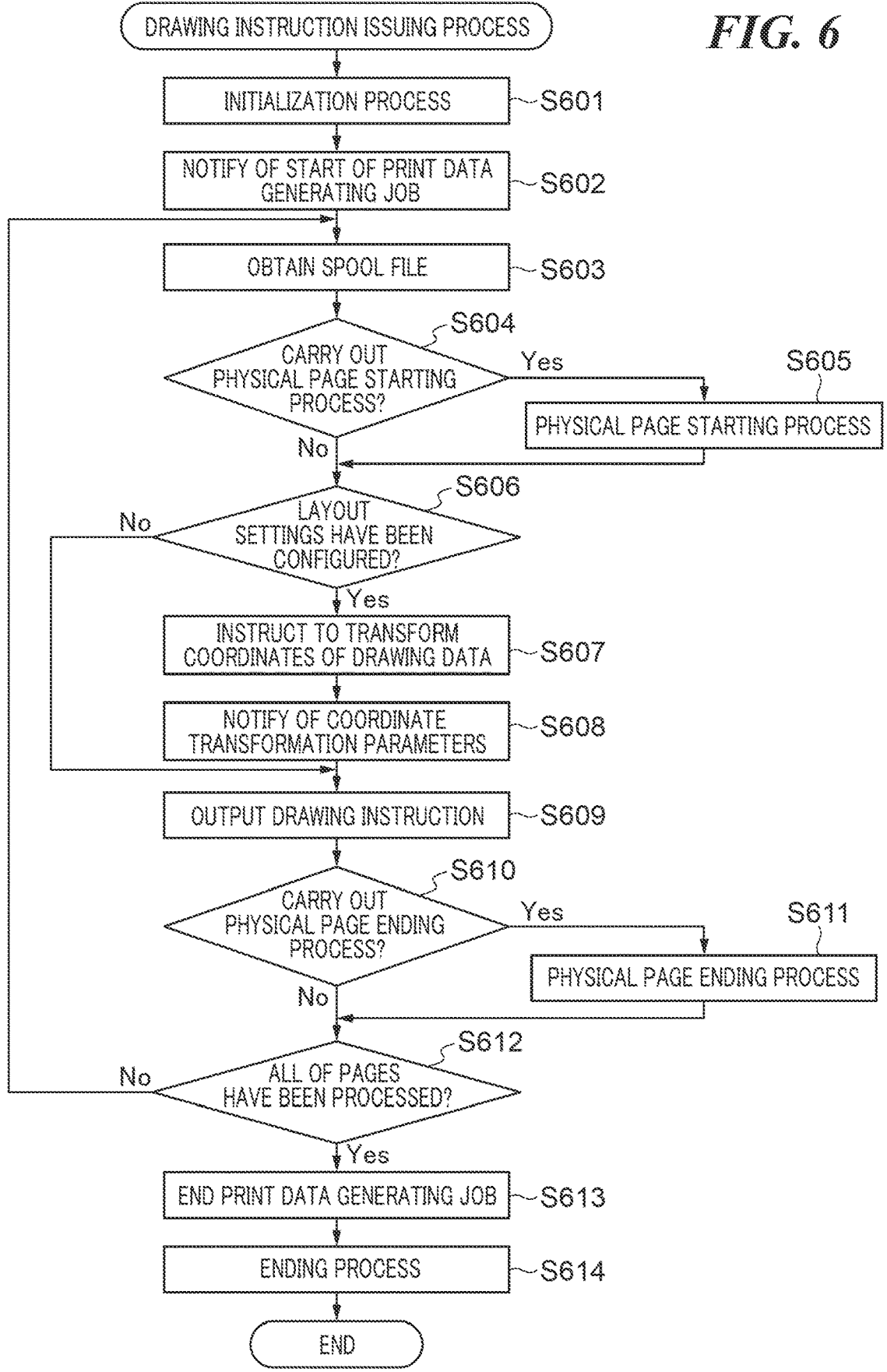
FIG. 6 is a flowchart showing the procedure of a drawing instruction issuing process which is carried out by a print processor in FIG. 3.

FIG. 6 is a flowchart showing the procedure of a drawing instruction issuing process which is carried out by the print processor 305 in FIG. 3. The process in FIG. 6 is implemented by the CPU 201 executing a program stored in the ROM 203 or the external memory 209. The process in FIG.

6 is carried out when the print processor 305 is loaded onto the spooler service based on a print data generating job starting instruction issued by the application 301.

Referring to FIG. 6, the print processor 305 carries out an initialization process (step S601). Next, the print processor 305 calls an API of the GDI 303, which indicates starting of a print data generating job, and notifies the GR processing module 308 of the start of the print data generating job from the GDI 303 (step S602). Then, the print processor 305 calls another API of the GDI 303 to obtain the stored spool file 401 (step S603). When drawing data in the spool file 401 is comprised of a plurality of pages, the print processor 305 identifies one page from among the plurality of pages.

Then, the print processor 305 determines whether or not it is necessary to carry out a physical page starting process (step S604). It should be noted that a physical page does not mean a logical page in 2 in 1 printing, but means a page of printed matter. The physical page starting process is carried out when the one page is a page to be printed on a different sheet from a page preceding the one page. For example, when the one page is a first logical page in 2 in 1 printing as with the logical page 505 in FIG. 5B, the one page corresponds to a page to be printed on a different sheet from a page preceding the one page. In this case, the print processor 305 determines that it is necessary to carry out the physical page starting process. On the other hand, when the one page is a second logical page as with the logical page 506 in FIG. 5B, the one page corresponds to a page to be printed on the same sheet as a first logical page preceding the one page. In this case, the print processor 305 determines that it is unnecessary to carry out the physical page starting process.

As a result of the determination in the step S604, when it is unnecessary to carry out the physical page starting process, the print processor 305 carries out a process in step S606, which will be described later. As a result of the determination in the step S604, when it is necessary to carry out the physical page starting process, the print processor 305 carries out the physical page starting process (step S605). The printer driver 306 is thus notified that the one page is a page to be printed on a different sheet from a page preceding the one page. Then, the print processor 305 refers to print setting information in the spool file 401 obtained in the step S603 and determines whether or not layout settings such as enlargement/reduction, rotation, and movement have been configured (step S606).

As a result of the determination in the step S606, when the layout settings have not been configured, the print processor 305 carries out a process in step S609, which will be described later. As a result of the determination in the step S606, when the layout settings have been configured, the print processor 305 instructs the GDI 303 to transform coordinates of drawing data based on the layout settings (step S607). In the step S607, the print processor 305 uses the SetWorldTransform function as an API that instructs the GDI 303 to perform the coordinate transformation. The SetWorldTransform function provided by the GDI 303 requires six coordinate transformation parameters eM11, eM12, eM21, eM22, eDx, and eDy, which are expressed by equations (1) and (2) below when transforming coordinates (x, y) into coordinates (x', y').

$$x' = x*eM11 + y*eM12 + eDx \quad (1)$$

$$y' = x*eM21 + y*eM22 + eDy \quad (2)$$

The equations (1) and (2) represent equations for affine transformations that perform linear mappings including parallel movement (such as enlargement, reduction, movement, rotation, and skewing).

The print processor 305 calculates the above six coordinate transformation parameters based on setting values for enlargement/reduction and N in 1 included in the specified layout settings, a size of a targeted logical page, a size of printed matter, and so forth. Then, the print processor 305 sets the calculated coordinate transformation parameters as arguments for the SetWorldTransform function and instructs the GDI 303 to perform the coordinate transformation. The print processor 305 also notifies the printer driver 306 of the calculated six coordinate transformation parameters as parameters for carrying out the process to rotate the brushes (step S608). Specifically, the print processor 305 calls ExtEscape(), that is an API of the GDI 303, and notifies the GR processing module 308 of the printer driver 306 of the calculated six coordinate transformation parameters.

ExtEscape() is an API that is provided by the GDI 303 for the print processor 305, a universal application, or the like to send and receive data to and from the GR processing module 308. ExtEscape() uses the ExtEscape function in sending and receiving data. One which calls ExtEscape() such as the print processor 305 and one which is called such as the GR processing module 308 arranges an escape ID value and input data and output data structures in advance. The print processor 305 outputs information on storage areas for input data and output data as well as the escape ID value determined in advance to the GR processing module 308. On the other hand, when ExtEscape() as well as the escape ID value determined in advance is called, the GR processing module 308 reads input data sent from the print processor 305. The GR processing module 308 also sends data to a storage area indicated by the information on the output data storage area, which has been sent from the print processor 305.

Then, the print processor 305 calls an API of the GDI 303 to generate a drawing instruction for the one page. After that, the print processor 305 outputs the drawing instruction for the one page to the GR processing module 308 of the printer driver 306 via the GDI 303 (step S609). It should be noted that the coordinate transformation instruction issued in the step S607 is reflected on the drawing instruction for the one page, but detailed instructions for respective drawing objects, and more specifically, information about converting orientations of brush drawing patterns are not incorporated in the drawing instruction for the one page. The GR processing module 308 that has obtained the drawing instruction converts the drawing instruction into print data printable by the printer 102. The print processor 305 then determines whether or not it is necessary to carry out a physical page ending process (step S610). The physical page ending process is carried out in a case where the one page is a page to be printed on a different sheet from a page succeeding the one page. For example, when the one page is a first logical page in 2 in 1 printing as with the logical page 505 in FIG. 5B, the one page corresponds to a page to be printed on the same sheet as second logical page succeeding the one page. In this case, the print processor 305 determines that it is unnecessary to carry out the physical page ending process. On the other hand, when the one page is the second logical page in 2 in 1 printing as with the logical page 506 in FIG. 5B, the one page corresponds to a page to be printed on a sheet different from a page succeeding the one page. In this case, the print processor 305 determines that it is necessary to carry out the physical page ending process.

As a result of the determination in the step S610, when it is unnecessary to carry out the physical page ending process, the print processor 305 carries out a process in step S612, which will be described later. As a result of the determination in the step S610, when it is necessary to carry out the physical page ending process, the print processor 305 carries out the physical page ending process (step S611). The printer driver 306 is thus notified that the one page is a page to be printed on a different sheet from a page succeeding the one page. Then, the print processor 305 determines whether or not all of pages included in the drawing data have been processed (step S612).

As a result of the determination in the step S612, when any of the pages included in the drawing data has not been processed, the print processor 305 returns to the process in the step S603. As a result of the determination in the step S612, when all of the pages included in the drawing data have been processed, the print processor 305 ends the print data generating job (step S613). Specifically, the print processor 305 calls an API of the GDI 303 which indicates the end of the print data generating job. The print processor 305 then carries out an ending process (step S614) to end the present process.

Figure 7:
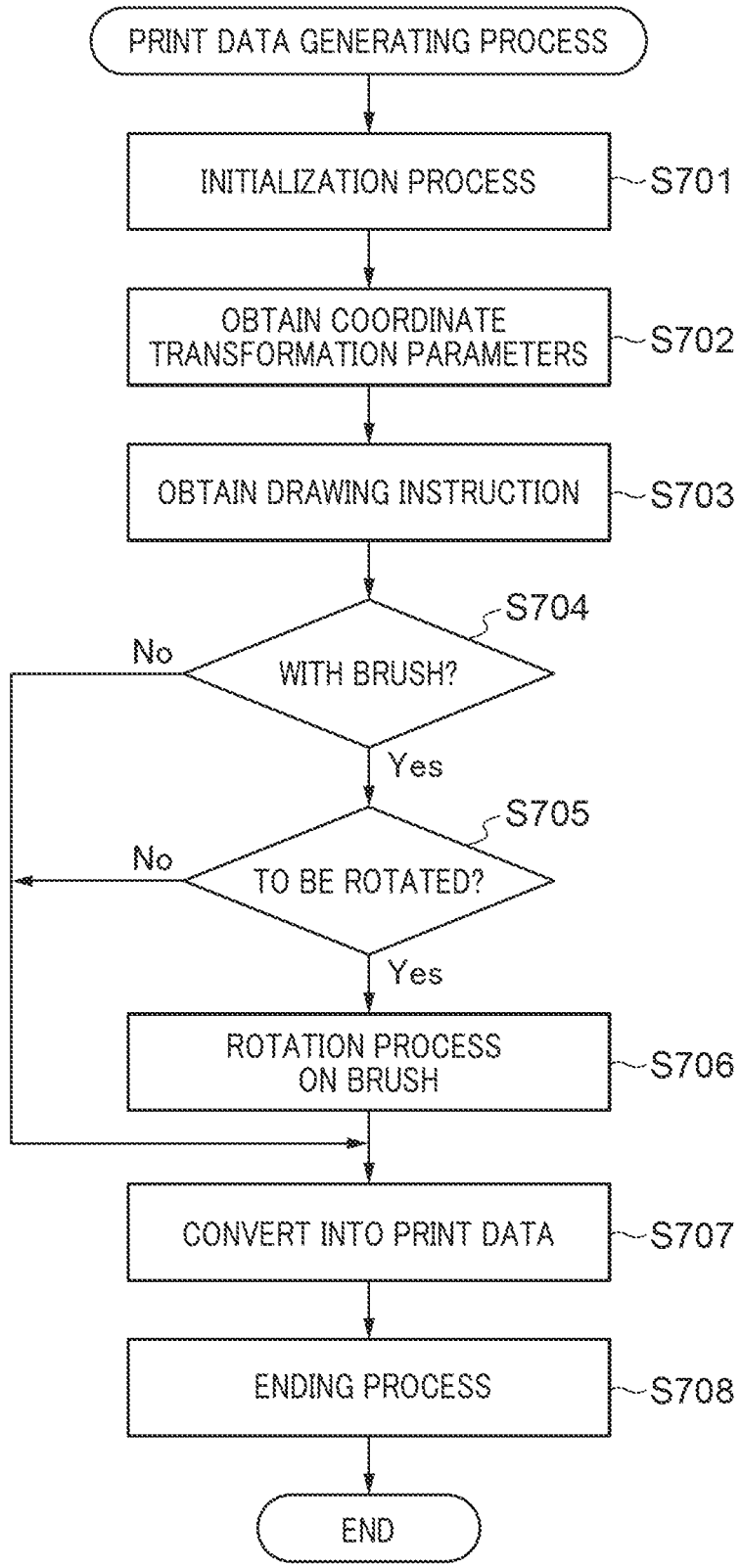
FIG. 7 is a flowchart showing the procedure of a print data generating process which is carried out by a GR processing unit in FIG. 3.

FIG. 7 is a flowchart showing the procedure of a print data generating process which is carried out by the GR processing module 308 in FIG. 3. The process in FIG. 7 is implemented by the CPU 201 executing a program stored in the ROM 203 or the external memory 209. The process in FIG. 7 is carried out when the GDI 303 has provided notification about the start of a print data generating job.

Referring to FIG. 7, the GR processing module 308 carries out an initialization process (step S701). Then, the GR processing module 308 obtains the six coordinate transformation parameters of which it was notified in the step S608 (step S702). After that, the GR processing module 308 obtains a drawing instruction for one page output from the GDI 303 in the step S609 (step S703). The GR processing module 308 then determines whether or not the obtained drawing instruction includes brushes such as a hatch brush and a bitmap brush (step S704).

As a result of the determination in the step S704, when the obtained drawing instruction includes brushes, the GR processing module 308 determines whether or not a rotation process has been carried out on drawing data on the one page based on the obtained coordinate transformation parameters (step S705). For example, when the obtained coordinate transformation parameters indicate 90-degree rotation of the drawing data on the one page, eM11 which is a parameter for an X coordinate is "0", and eM12 is "−1 ". Also, eM21 which is a parameter for a Y coordinate is "1", and eM22 is "0 ". With such parameter values, the GR processing module 308 determines that the rotation process has been carried out on the drawing data on the one page. It should be noted that when eM11 to eM22 include enlargement/reduction components, only a rotational component should be extracted, then a normalization process should be carried out in which, for example, each parameter is divided by a maximum value within eM11 to eM22, and after that, whether or not the rotation process has been carried out should be determined. Possible rotational angles in page-by-page rotation are 90 degrees, 180 degrees, and 270 degrees, and one of 1, 0, and −1 is adopted as a parameter for the rotational component. The rates of enlargement and reduction in an X direction and a Y direction in page-by-page enlargement are equal. Therefore, a rotational component is extracted with effects of enlargement and reduction being removed with division by the maximum value.

As a result of the determination in the step S705, when the rotation process has not been carried out on drawing data on the one page, or as a result of the determination in the step S704, when the obtained drawing instruction includes no brush, the GR processing module 308 carries out a process in step S707, which will be described later.

As a result of the determination in the step S705, when the rotation process has been carried out on drawing data on the one page, the GR processing module 308 carries out the rotation process on the brush in the drawing data on the one page (step S706). Specifically, the GR processing module 308 changes the orientation of the brush in the drawing data on the one page based on the obtained coordinate transformation parameters. Then, the GR processing module 308 converts the drawing instruction into print data (step S707). It should be noted that the change in the orientation of the brush in the step S706 is reflected on the print data obtained as a result of the conversion in the step S707. Then, the GR processing module 308 outputs the print data to the Windows spooler 304. The Windows spooler 304 sends the print data to the printer 102. After that, the GR processing module 308 carries out an ending process for the job (step S708) to end the present process.

According to the embodiment described above, in a case where a drawing instruction from the print processor 305 includes an instruction to carry out a rotation process on drawing data, the print processor 305 notifies the printer driver 306 of coordinate transformation parameters for carrying out the rotation process on a brush included in the drawing data, and the rotation process on the brush included in the drawing data is carried out based on the coordinate transformation parameters. As a result, the orientation of the brush included in the drawing data is changed in accordance with the rotation process on the drawing data, and hence print data based on which appropriate printed matter intended by the user is output is generated.

Moreover, in the embodiment described above, the print processor 305 calculates the above coordinate transformation parameters using the SetWorldTransform function. Thus, in the computer 101 that carries out an image conversion process on drawing data using the SetWorldTransform function, a rotation process on a brush included in drawing data is properly carried out.

It should be noted that in a case where a process that changes the position of a brush is carried out, the printer driver 306 may be notified of coordinate transformation parameters for use in transforming origin coordinates of the brush.

Figure 8A:
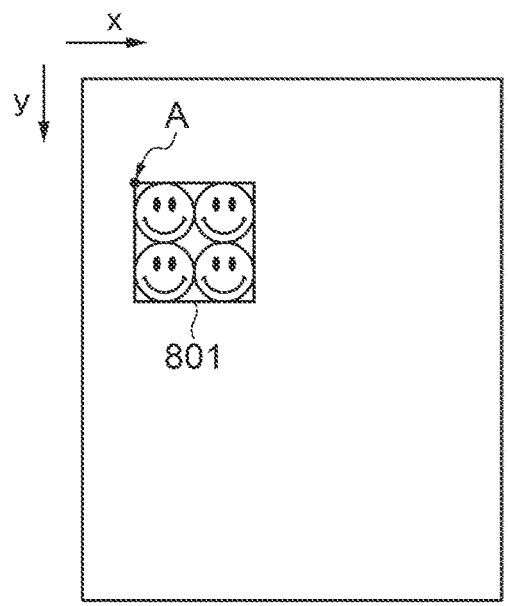
FIGS. 8A to 8C are views useful in explaining a bitmap brush drawn by the computer in FIG. 1.
Figure 8B:
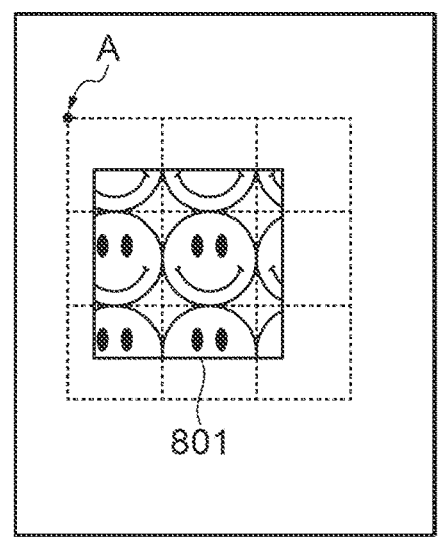

For example, in a case where a bitmap brush is to be drawn, a plurality of drawing patterns placed with an origin A in a user designated area 801 as a reference point is drawn in the user designated area 801 (see, for example, FIG. 8A). When such drawing data is subjected to an enlargement process, coordinates of the user designated area 801 are transformed in accordance with changes in the position and size of the user designated area 801 in the drawing data. Coordinates of the origin A in the user designated area 801, however, are physical coordinates, and hence the coordinates are not transformed in this enlargement process. For this reason, when a process that changes the position of a brush in drawing data including the brush, and more specifically, an enlargement process or a reduction process is carried out on the drawing data, the positions of drawing patterns relative to the user designated area 801 are displaced as shown in FIG. 8B as compared to a state prior to the process.

Figure 8C:
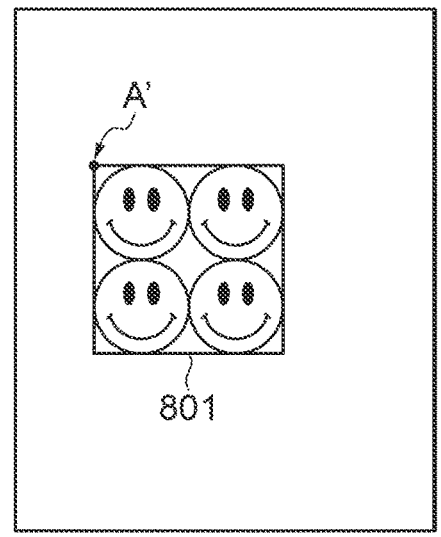

To address this problem, in the present embodiment, in a case where coordinate transformation of drawing data has been performed, the print processor 305 notifies the printer driver 306 of coordinate transformation parameters for transforming origin coordinates of a brush included in the drawing data. Based on the coordinate transformation parameters, the printer driver 306 transforms origin coordinates of a brush included in print data. As a result, for example, print data with the origin A of the brush transformed into an origin A' in FIG. 8C is generated.

Figure 9:
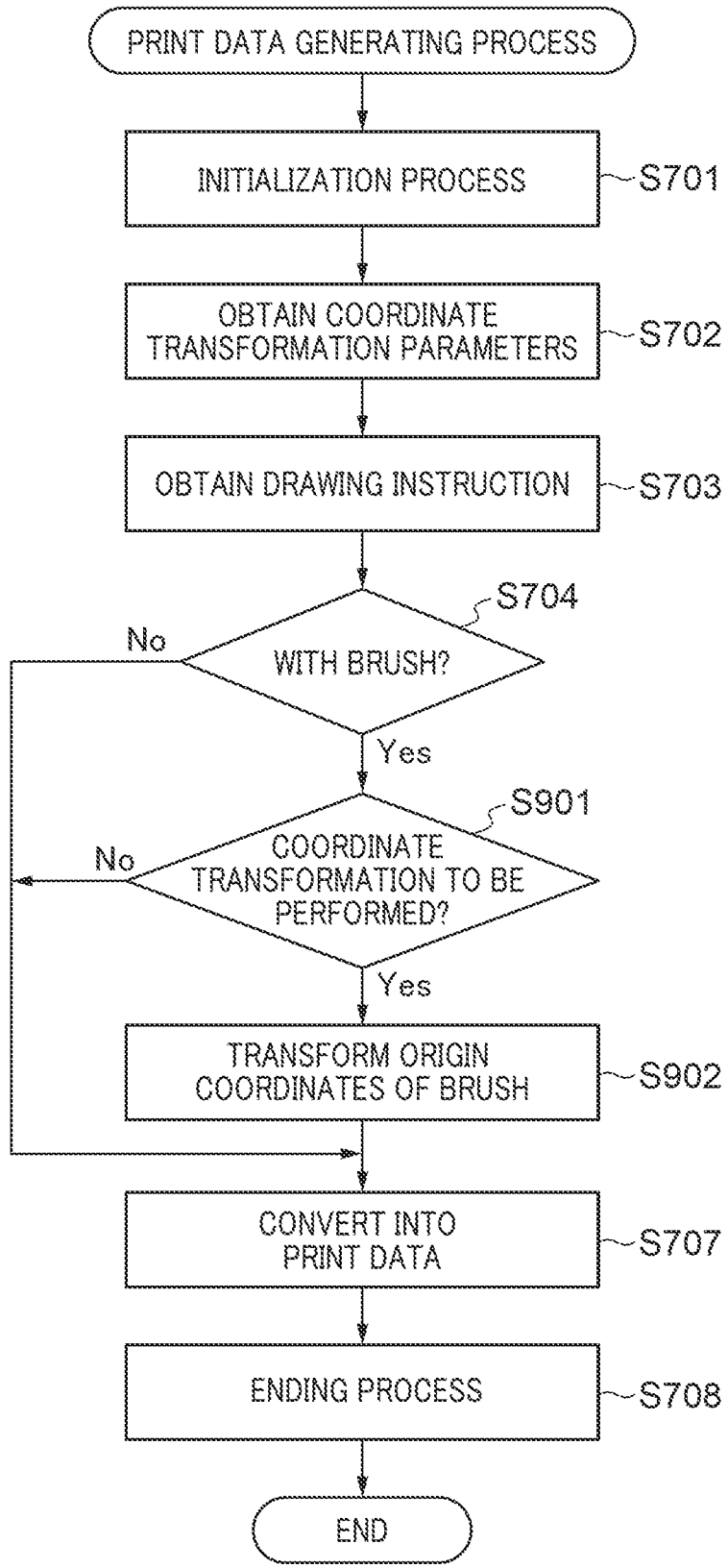
FIG. 9 is a flowchart showing the procedure of a variation of the print data generating process in FIG. 7.

FIG. 9 is a flowchart showing the procedure of a variation of the print data generating process in FIG. 7. The process in FIG. 9 is also implemented by the CPU 201 executing a program stored in the ROM 203 or the external memory 209. The process in FIG. 9 is also carried out when the GDI 303 has provided notification about the start of a print data generating job.

Referring to FIG. 9, the GR processing module 308 carries out processes in the steps S701 to S704. Then, based on the obtained coordinate transformation parameters, the GR processing module 308 determines whether or not coordinate transformation of drawing data on one page has been carried out (step S901).

As a result of the determination in the step S901, when coordinate transformation of the drawing data on the one page has not been carried out, the GR processing module 308 carries out the processes in the step S707 and the subsequent steps. As a result of the determination in the step S901, when coordinate transformation of the drawing data on the one page has been carried out, the GR processing module 308 transforms origin coordinates of a brush included in the drawing data based on the obtained coordinate transformation parameters (step S902). Then, the GR processing module 308 carries out the processes in the step S707 and the subsequent steps.

In the embodiment described above, in a case where coordinate transformation of drawing data has been carried out, the printer driver 306 is notified of coordinate transformation parameters for transforming origin coordinates of a brush included in the drawing data, and based on the coordinate transformation parameters, the origin coordinates of the brush in print data are transformed. As a result, the origin coordinates of the brush included in the drawing data are transformed into appropriate coordinates in accordance with an enlargement process or a reduction process on the drawing data, and hence print data based on which appropriate printed matter intended by the user is output is generated.

In the embodiment described above, the print processor 305 notifies the printer driver 306 of coordinate transformation parameters, and the printer driver 306 analyzes the coordinate transformation parameters to determine whether or not it is necessary to carry out a process on brushes and details of the process, but the present invention is not limited to this. The print processor 305 may identify details of image processing that should be performed on the brush by the printer driver 306 and notify the printer driver 306 of parameters required to perform the image processing. For example, the print processor 305 may notify the printer driver 306 of a parameter indicating a rotational component for rotating the brush and/or a parameter indicating a parallel moving component for transforming starting coordinates of the brush. In this case, the printer driver 305 should rotate drawing data on a brush object and/or correct origin coordinates of the brush object based on the parameters of which it has been notified.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)TM), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-167037, filed Sep. 6, 2018, which is hereby incorporated by reference herein in its entirety.

What is claimed is:

1. An information processing apparatus comprising:
a controller including at least one processor and at least one memory storing a print processor, the controller configured to:
  receive, using the print processor, drawing data including at least one object that is filled with a predetermined pattern;
  generate, using the print processor, a coordinate transformation parameter to be used for performing coordinate transformation on coordinates of the at least one object based on the received drawing data;
  provide, using the printer processor, the generated coordinate transformation parameter to a Graphic Device Interface (GDI), which performs the coordinate transformation on the coordinates of the at least one object; and
  provide, using the print processor, the generated coordinate transformation parameter to a printer driver, which receives the drawing data subjected to the coordinate transformation on the coordinates of the at least one object by the GDI, to enable the printer driver to perform coordinate transformation using the coordinate transformation parameter on the predetermined pattern.

2. The information processing apparatus according to claim 1, wherein:

the drawing data includes a plurality of objects, including the at least one object, and the at least one object filled with the predetermined pattern is a brush object.

3. The information processing apparatus according to claim 1, wherein the coordinate transformation parameter provided to the GDI and the coordinate transformation parameter provided to the printer driver are the same.

4. The information processing apparatus according to claim 1, wherein:

the drawing data includes a plurality of objects, including the at least one object; and the GDI performs the coordinate transformation on the coordinates of the at least one object but not on coordinates of at least another object, among the plurality of objects.

5. The information processing apparatus according to claim 1, wherein the GDI performs the coordinate transformation on the coordinates of the at least one object but not on the predetermined pattern.

6. A control method for an information processing apparatus, the control method comprising:

receiving, using a print processor, drawing data including at least one object that is filled with a predetermined pattern;

generating, using the print processor, a coordinate transformation parameter to be used for performing coordinate transformation on coordinates of the at least one object based on the received drawing data;

providing, using the print processor, the generated coordinate transformation parameter to a Graphic Device Interface (GDI), which performs the coordinate transformation on the coordinates of the at least one object; and providing, using the print processor, the generated coordinate transformation parameter to a printer driver, which receives the drawing data subjected to the coordinate transformation on the coordinates of the at least one object by the GDI, to enable the printer driver to perform coordinate transformation using the coordinate transformation parameter on the predetermined pattern.

7. The method according to claim 6, wherein:

the drawing data includes a plurality of objects, including the at least one object, and the at least one object filled with the predetermined pattern is a brush object.

8. The method according to claim 6, wherein the coordinate transformation parameter provided to the GDI and the coordinate transformation parameter provided to the printer driver are the same.

9. The method according to claim 6, wherein:

the drawing data includes a plurality of objects, including the at least one object, and the GDI performs the coordinate transformation on the coordinates of the at least one object but not on coordinates of at least another object, among the plurality of objects.

10. The method according to claim 6, wherein the GDI performs the coordinate transformation on the at least one object but not on the predetermined pattern.

* * * * *